Figure 1:
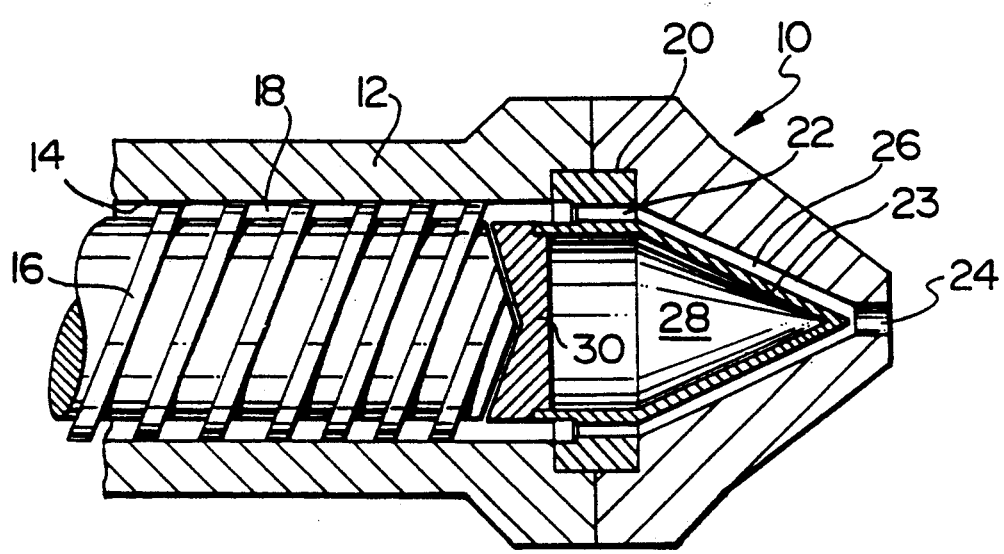

United States Patent [19]

Garner

[11] Patent Number: 5,250,249
[45] Date of Patent: Oct. 5, 1993

[54] EXTRUSION APPARATUS AND METHODS OF EXTRUSION

[75] Inventor: John N. Garner, Kingston, Canada

[73] Assignee: Northern Telecom Limited, Montreal, Canada

[21] Appl. No.: 940,280

[22] Filed: Sep. 3, 1992

[51] Int. Cl.$^5$ .............................................. B29C 47/70
[52] U.S. Cl. ...................... 264/176.1; 264/169; 264/211.21; 264/323; 425/197; 425/382.4
[58] Field of Search ................ 264/176.1, 169, 211.21, 264/211.23, 323, 349; 425/197, 199, 183, 185, 207, 208, 206, 382.4

[56] References Cited

U.S. PATENT DOCUMENTS

| | | | |
|---|---|---|---|
| 1,800,180 | 4/1931 | Day | 264/211.21 |
| 3,079,634 | 3/1963 | Berger | 425/461 |
| 3,171,160 | 3/1965 | Moyer | 425/207 |
| 3,187,382 | 6/1965 | Lowe | 425/199 |
| 3,284,848 | 11/1966 | Rice | 425/197 |
| 3,317,956 | 5/1967 | Lippens | 425/207 |
| 3,609,806 | 10/1971 | Schippers et al. | 425/197 |
| 4,217,083 | 8/1980 | Machuque | 425/199 |
| 4,243,629 | 1/1981 | Tramezzani | 425/207 |
| 4,318,677 | 3/1982 | Ullrich et al. | 425/185 |

FOREIGN PATENT DOCUMENTS 54-38362  3/1979  Japan ................. 264/176.1

*Primary Examiner*—Jeffery Thurlow
*Attorney, Agent, or Firm*—R. J. Austin

[57] ABSTRACT

Extrusion apparatus and a method of extruding in which an extrusion screw terminates close to a breaker plate so that an annular passage surrounding the screw extends to the breaker plate. The breaker plate has flow apertures arranged around an edge region of the plate for direct communication with the annular passage. The flow passage arrangement decreases in cross-sectional area in a downstream direction whereby plastics materials do not become static in certain regions. Plastics degradation, particularly for PVC, is therefore avoided.

4 Claims, 1 Drawing Sheet

EXTRUSION APPARATUS AND METHODS OF EXTRUSION

This invention relates to extrusion apparatus and methods of extrusion.

In existing plastics extrusion apparatus, an extruder screw works and heats plastic material to be extruded while moving the material in molten condition so as to pass it from one end of the extruder barrel and through an breaker plate. After exiting from the breaker plate the plastic material continues along a passage and from an outlet to the apparatus.

With existing apparatus, the screw is mounted at its upstream end and extends in cantilever fashion along the barrel to be held in place substantially coaxially with the barrel by the plastics material to be extruded as the plastics material moves along an annular passage surrounding and partly defined by the screw. A breaker plate extends for the full width of the barrel in a position slightly downstream from the downstream end of the barrel, the breaker plate having through apertures spaced across it. The molten material passes from the annular passage to a short, cylindrical passage between the screw and the breaker plate so as to fully contact across the upstream face of the breaker plate, the material then flowing from the cylindrical passage through the flow apertures in the breaker plate and towards the extruder outlet. The cylindrical passage is of larger cross-sectional area than the annular passage and hence the molten material decelerates in the cylindrical passage. Eddies in the material result as it flows into the cylindrical passage to the flow apertures through the breaker plate and stationary regions of the plastics material tend to collect against the breaker plate. In these stationery regions certain materials, such as polyvinyl chloride, start to degrade over lengthy time periods. Degradation causes material breakup of the material and resultant contaminants tend to block any screen positioned by the breaker plate.

The present invention seeks to provide an extrusion apparatus and a method of extrusion which will minimize the above problem.

Accordingly the present invention provides an extrusion apparatus comprising an extruder barrel, an extrusion screw extending along the barrel to define an annular flow passage around the screw, an annular breaker plate downstream of the extrusion screw, the annular flow passage extending to an upstream end of the annular breaker plate and communicating with flow apertures spaced around and extending axially through the annular breaker plate, and downstream of the breaker plate, the flow apertures communicate with a tapering flow passage of annular cross-section and of decreasing cross-sectional area as it extends in a downstream direction.

With the above apparatus, because the annular flow passage communicates directly with the flow apertures through the breaker plate, then no cylindrical part of the passage exists between the annular passage and the breaker plate. As a result, in use, molten material does not collect and slow down in such a cylindrical passage and therefore the possibility of degradation of the material during extrusion is minimized. It has been found with the use of the above apparatus that there is little possibility of the molten material becoming stationary in pockets or localized areas in the passage, because there is no localized reduction in extrusion pressure such as would be caused by a sudden increase in cross-sectional area of the flow passage for the material in a downstream direction. In fact, with the extrusion apparatus of the invention, the flow apertures collectively must have a cross-sectional area which is less than the annular flow passage surrounding the screw so that molten material is forced to pass through the flow apertures at a faster rate than it is along the annular passage, flow at positions upstream of the breaker plate being maintained above a certain required minimum rate so that degradation is avoided or minimized.

Preferably the cross-sectional area at the upstream end of the tapering annular flow passage does not exceed the total cross-sectional area of the flow apertures through the breaker plate. Hence, with the preferred arrangement, the material being extruded does not tend to collect in localized regions on the downstream side of the breaker plate, but is caused to move directly from the flow apertures and along the tapering annular flow passage in which, of course, the pressure is increased and the material moves at a progressively increasing rate towards the outlet from the extrusion apparatus.

It is also to be preferred that the inner boundary of the tapering flow passage is defined by a tapering member which has a hollow interior. A benefit of such a structure is that it reduces the thermal mass in the breaker plate region, thereby reducing its tendency to operate as a heat sink by conducting heat from the molten material as it passes through and beyond the breaker plate. With this hollow arrangement, the tapering member has a closure at the upstream end to the interior so as to prevent the material from entering the tapering member.

In a practical sense, in constructions according to the invention, either the extrusion screw extends downstream to a position closely adjacent to the downstream position of the breaker plate, or alternatively, there is a spacer member axially aligned with the extrusion screw which lies axially between the extrusion screw and the breaker plate. In the preferred arrangement using the closure on the tapering member, the closure itself may lie in close face-to-face opposing relationship with the downstream end of the extrusion screw. In use of the apparatus, because the flow apertures through the breaker plate only extend around the plate in alignment with the annular flow passage surrounding the screw, then there is little reason for the molten material to flow into any space provided at the downstream end of the screw, even though such a space may be insubstantial. This is because the tendency is for the material to flow through the apertures under extrusion pressure.

The invention also includes a method of extruding a plastics material comprising:- subjecting the material to the action of a rotating extrusion screw within a extrusion barrel of extrusion apparatus to pressurize the material to render it molten and to move it downstream along an annular passage surrounding the barrel; and, under the extrusion pressure, forcing the molten material through flow apertures spaced around an annular breaker plate and aligned with the annular flow passage while maintaining the material in the annular flow passage until it enters the flow apertures, and then forcing the material from the flow apertures and along a tapering flow passage of annular cross-section and of decreasing cross-sectional area towards an outlet of the extrusion apparatus.

Figure 2:
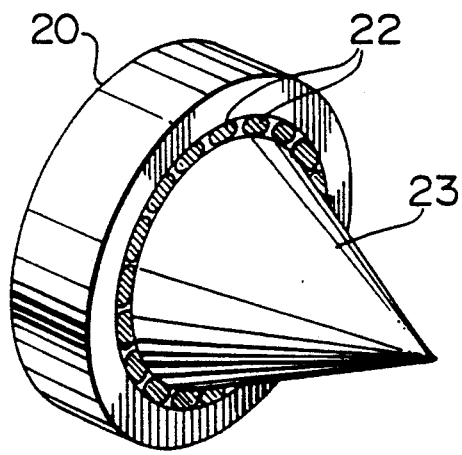

One embodiment of the invention will now be described by way of example, with reference to the accompanying drawings, in which:

FIG. 1 is a cross-sectional view taken along the longitudinal axis of an extrusion apparatus according to the embodiment; and FIG. 2 is an isometric view of part of the extrusion apparatus.

As shown in FIG. 1, an extrusion apparatus 10 for PVC material comprises a casing 12 having a bore 14 within which is housed a conventional extrusion screw 16. Between the extrusion screw and the casing is defined an annular passage 18 which extends for the full length of the screw. At the downstream end of the screw 16 is disposed a breaker plate 20. The breaker plate 20 is retained in conventional manner within the housing. However, the breaker plate 20 differs from a conventional breaker plate in that it is provided with flow apertures 22 which are only located around an annular region as shown by FIG. 2, the breaker plate 20 itself also being annular. These flow apertures 22 communicate directly with the downstream end of the flow passage 18 and are radially positioned so as to be in direct axial alignment with the flow passage 18.

The breaker plate 20 forms an assembly with a tapering member 23 around which the breaker plate is assembled. This tapering member tapers towards a downstream end of the member at which position it is disposed slightly upstream of but adjacent to an extrusion orifice 24. The tapering member 23 defines the inner boundary of a tapering flow passage 26, the outer boundary of which is formed by the casing 12. The tapering flow passage 26 interconnects directly with the downstream ends of the flow apertures 22.

The tapering member 23 has a hollow interior 28 and a closure plate 30 at the upstream end of the tapering member 23 seals the interior from ambient conditions. Also as may be seen from FIG. 1, the closure member 30 and screw 16 lie axially close together. In fact, if the closure member is formed of a material which has a lubricating function, the screw 16 may actually contact and rotate upon the closure member. Such a material for the closure member may, for instance, be "Graphalloy" (trade mark) which is a graphite alloy bearing material, or a polyimide which is operational up to at least 600° F.

The arrangement is such that the flow passage 18 extends directly to the upstream face of the breaker plate 20 to communicate with the flow apertures 22 which directly communicate with the tapering flow passage 26. The combined cross-sectional area of the flow apertures 22 is less than the cross-sectional area of the flow passage 18 and, preferably, the cross-sectional area of the tapering flow passage 26 at its upstream end is no greater than the combined cross-sectional areas of the flow apertures 22.

Upstream of the breaker plate, a screen may be disposed to filter out any unmixed non-molten materials which are moving towards the flow apertures 22.

In use, polyvinyl chloride material to be extruded is forced along the annular flow passage 18 by the screw 16. Upon reaching the downstream end of the flow passage 18 the polyvinyl chloride in molten condition is forced under pressure through the flow apertures 22 and from there into the tapering cross-section passage 26 before being extruded through the outlet 24. As may be seen from the above description, the cross-sectional areas for flow of the molten material decrease in a downstream direction of the apparatus so that this minimizes the possibility of any of the polyvinyl chloride collecting in static regions anywhere within the apparatus. The reduction in cross-sectional area in the downstream direction results in the material being forced to travel faster from position to position, i.e., from the annular passage 18 into the flow apertures 22 and then into the tapering flow passage 23 and this detracts from the possibility of static material lying through the passage system. Hence, there is little or no opportunity for the polyvinyl chloride to degrade and any subsequent problems are also avoided.

It is worth noting that the apparatus is constructed in such a way that the polyvinyl chloride naturally tends to be forced through the flow apertures 22 under extrusion pressure instead of being forced between the extruder screw 16 and the closure plate 30. If there is no outlet in the breaker plate in axial alignment with the cylindrical part of the extruder then the flow of the polyvinyl chloride will naturally occur only through the flow apertures 22. In addition, the hollow interior 28 of the tapering member 23 minimizes the mass of the breaker plate and the tapering member which needs to be heated. Thus the tapering member 23 does not operate as a heat sink which could result in an undesirable lowering of temperature in the polyvinyl chloride within the passage 26.

What is claimed is:

1. An extrusion apparatus for plastics material comprising:

an extruder barrel;

an extrusion screw extending along the barrel to define an annular flow passage around the screw, the screw having a downstream end surface disposed inwardly of the annular passage; and a breaker plate downstream of the extrusion screw, the breaker plate formed with a plurality of apertures extending axially therethrough, all of the apertures being in circumferentially spaced apart relationship, and confined to an annular breaker plate region radially outwardly of the downstream end surface of the screw and an axial alignment with the annular flow passage, the apertures communicating at downstream ends with a tapering flow passage of annular cross-section and of decreasing cross-sectional area in a downstream direction to an extrusion orifice;

the screw extending downstream to a position to cause direct interconnection of the annular flow passage, in annular form, with the circumferentially spaced apertures whereby throughflow of molten plastics material will occur solely along the annular passage, through the apertures, and through the tapering flow passage while bypassing the downstream end surface of the screw.

2. Apparatus according to claim 1 provided with a tapering member which defines the inner boundary of the tapering flow passage, the tapering member having a totally enclosed and inaccessible chamber.

3. Apparatus according to claim 1 wherein the cross-sectional area at the upstream end of the tapering annular flow passage does not exceed the total cross-sectional area of the flow apertures in the breaker plate.

4. A method of extruding a plastics material comprising:

subjecting the material to the action of a rotating extrusion screw within an extruder barrel of extrusion apparatus to pressurize the material to render it molten and move it downstream along an annular flow passage surrounding the barrel;

under the extrusion pressure, forcing the molten material in an axial direction through flow apertures formed axially through a breaker plate, all of the apertures being in circumferentially spaced apart relationship, confined to an annular breaker plate region in circumferentially spaced apart relationship radially outwardly of the downstream end surface of the screw and in axial alignment with the annular flow passage, movement to the flow apertures being directly from the annular flow passage while bypassing the downstream end surface of the screw; and then forcing the material from the flow apertures and along a tapering flow passage of annular cross-section and of decreasing cross-sectional area towards an outlet of the extrusion apparatus.

* * * * *